US006290263B1

(12) United States Patent
Murken

(10) Patent No.: US 6,290,263 B1
(45) Date of Patent: Sep. 18, 2001

(54) DETACHABLE HOSE COUPLING HAVING IMPROVED INTERLOCKING STAPLE

(76) Inventor: Joseph S. Murken, 1061 Bay Harbor Cir., Centerville, OH (US) 45458

( * ) Notice: Subject to any disclaimer, the term of this patent is extended or adjusted under 35 U.S.C. 154(b) by 0 days.

(21) Appl. No.: 09/557,578

(22) Filed: Apr. 22, 2000

(51) Int. Cl.[7] .................................................. F16L 37/14
(52) U.S. Cl. ............................................ 285/13; 285/305
(58) Field of Search ............................ 285/305, 13, 14, 285/321; 411/457

(56) References Cited

U.S. PATENT DOCUMENTS

| | | | |
|---|---|---|---|
| 3,527,485 | * | 9/1970 | Goward et al. ................. 285/305 |
| 3,973,791 | * | 8/1976 | Porta et al. ..................... 285/305 |
| 4,260,184 | * | 4/1981 | Greenawalt et al. ............ 285/305 |
| 4,431,218 | * | 2/1984 | Paul, Jr. et al. ................ 285/305 |
| 4,537,427 | * | 8/1985 | Cooke ............................. 285/305 |
| 4,894,156 | * | 1/1990 | Murken .......................... 285/305 |
| 5,040,831 | * | 8/1991 | Lewis ............................. 285/305 |
| 5,135,264 | * | 8/1992 | Elliot-Moore ................. 285/305 |
| 5,964,483 | * | 10/1999 | Lon et al. ...................... 285/305 |

* cited by examiner

*Primary Examiner*—Eric K. Nicholson
(74) *Attorney, Agent, or Firm*—R. William Graham

(57) ABSTRACT

A detachable hose coupling having improved interlocking U-shaped staple includes a female sleeve piece, a male piece of a size and configuration to permit insertion into the female sleeve piece, and a generally U-shaped staple having a cross-section with a peripheral surface which includes at least one radially recessed surface portion to permit a predetermined amount of fluid flow thereby when inserted into the male—female coupling.

13 Claims, 3 Drawing Sheets

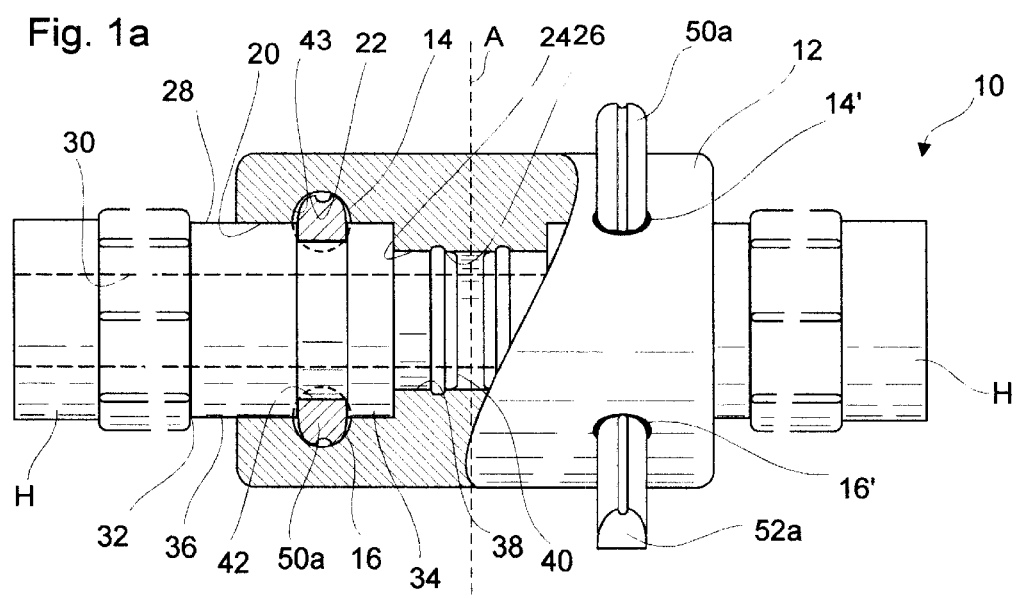
Fig. 1a
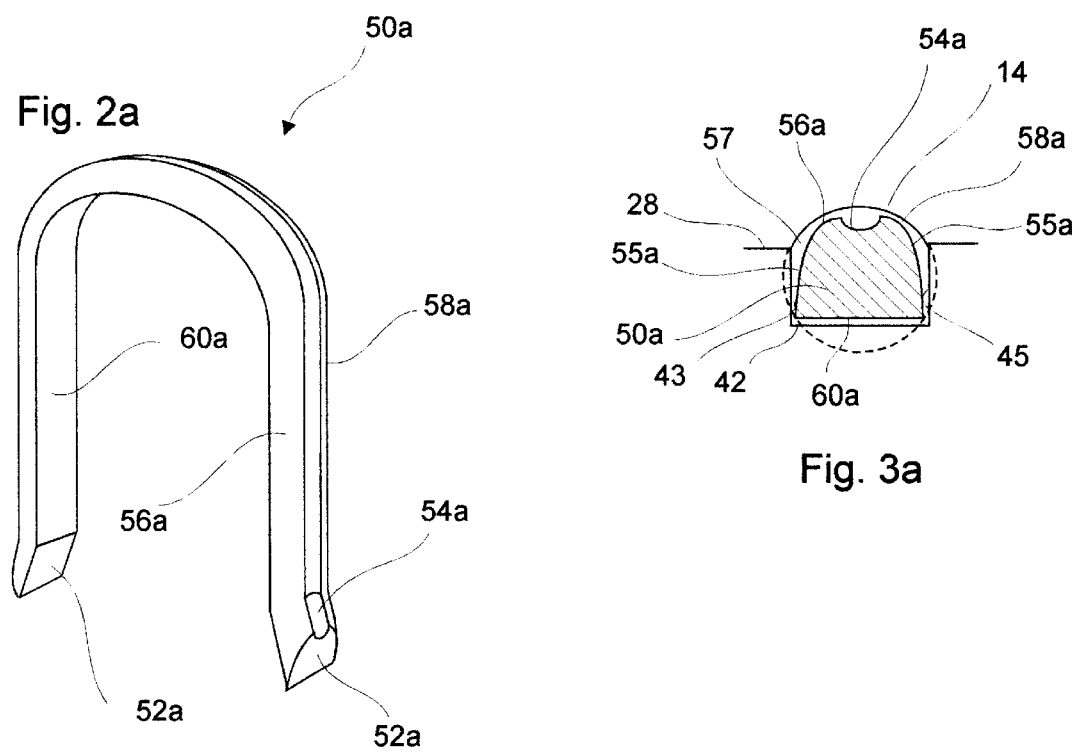
Fig. 2a
Fig. 3a

DETACHABLE HOSE COUPLING HAVING IMPROVED INTERLOCKING STAPLE

BACKGROUND OF THE INVENTION

1. Field of Invention

The present invention relates to hose couplings. More particularly, the invention is directed to a detachable hose coupling with an improved interlocking U-shaped staple for use in mining applications.

2. Prior Art

There exist a number of detachable coupling designs which include U-shaped interlocking staples. For example, U.S. Pat. Nos. 4,260,184 and 4,923,351 disclose fluid couplings which employ U-shaped staple connectors. The staples interlock male and female coupling pieces when disposed between aligned recessed or grooved surface areas of the exterior of the male piece and a bored surface of the female piece. Thus fair, the U-shaped staple connector has had either a rectangular, circular or D-shaped configuration. The grooved surface of the male piece commonly includes a linear line of contact and the bored surfaces include circular lines of contact. Consequently, the cross-sectional configuration of the U-shaped connector chosen impacted the coupling efficiency.

Each of the prior cross-sectional designs has benefits and disadvantages in certain field applications. Traditionally rectangular and circular cross-sectional U-shaped connectors have been employed in the coupling of the type of present invention due to their ease of manufacture and assembly. However, the rectangular cross-section has beer found to have short life due to fatigue as well as reduced tensile strength. Also, brinelling occurs within the circular bore of the female piece due to angled edges and causes stress points of coupling.

Likewise, the circular cross-section has been found to cause brinelling along a linear contact line of the male piece. However, fatigue and tensile strength of circular cross-sectional type configuration staple are greatly increased.

The advent of the D-shaped cross-section was an attempt to gain efficiencies of both prior configurations by incorporating shape to reduce wear at the points of contact of the staple at the sides and bottom of the grooved surface of the male piece by placing the curved surface of the staple in contact with the curved bored surface of the female piece. While the D-shaped cross-section was an attempt to solve the brinelling problem, it has not been readily accepted into a number of coupling fields.

This has been true in the mining industry which utilizes the rectangular cross-section U-shaped connector on a so-called "Super Stecko" coupling. Presumably, such D-shaped cross-sectional coupling staple connectors have yet to provide a suitable solution to uses in the field of coal mining, wherein coal dust, soot and oil can lodge between tight fittings and cause locking of coupling pieces.

Accordingly, there remains a need to improve detachable hose couplers. The present invention aims to overcome the stated problems in the art.

SUMMARY OF THE INVENTION

It is an object of the invention to improve detachable hose couplings in the field of mining.

It is a further object to improve U-shaped staple connectors for use in detachable hose couplings.

Accordingly, the present invention is directed a detachable hose coupling having improved interlocking U-shaped staple. The coupling includes a generally cylindrical female sleeve piece having a pair of coaxially aligned bored open surfaces which are in opposing generally equidistant positions and displaced from a vertical plane passing through a central longitudinal axis of the female sleeve piece. The female sleeve piece has a longitudinal axial open surface extending therethrough in communication with the bored open surfaces.

Also, provided is a generally cylindrical male piece of a size and configuration to permit insertion into the female sleeve piece. The male piece has a longitudinal axial open surface extending therethrough and further has external recessed surface portion which when the male piece is inserted into the female sleeve piece is generally alignable with the bored open surfaces to provide an interconnecting open surface through the detachable hose coupling. The recessed surface is further defined to provide a first line of contact of a first predetermined configuration in the interconnecting open surface and the bored open surfaces each provide a second and third line of contact of a second predetermined configuration in the interconnecting open surface.

A generally U-shaped staple is included and has a cross-section with at least a first peripheral surface of a complimentary configuration to the first predetermined configuration for contact with the first line of contact and having, a second peripheral surface of a complimentary configuration to the second predetermined configuration for contact with the second line and third lines of contact. At least one of the first peripheral surface and the second peripheral surface includes at least one radially recessed surface portion to permit a predetermined amount of fluid flow thereby.

BRIEF DESCRIPTION OF THE DRAWINGS

FIG. 1a is a side view of the present invention with a partial sectional cut-away showing the U-shaped staple of FIG. 2a.

FIG. 2a is a perspective of a U-shaped staple of the present invention showing the U-shaped staple of FIG. 3a.

FIG. 3a is a cross-section of the U-shaped staple of FIG. 2a.

DETAILED DESCRIPTION OF THE PREFERRED EMBODIMENTS OF THE INVENTION

Figure 1B:
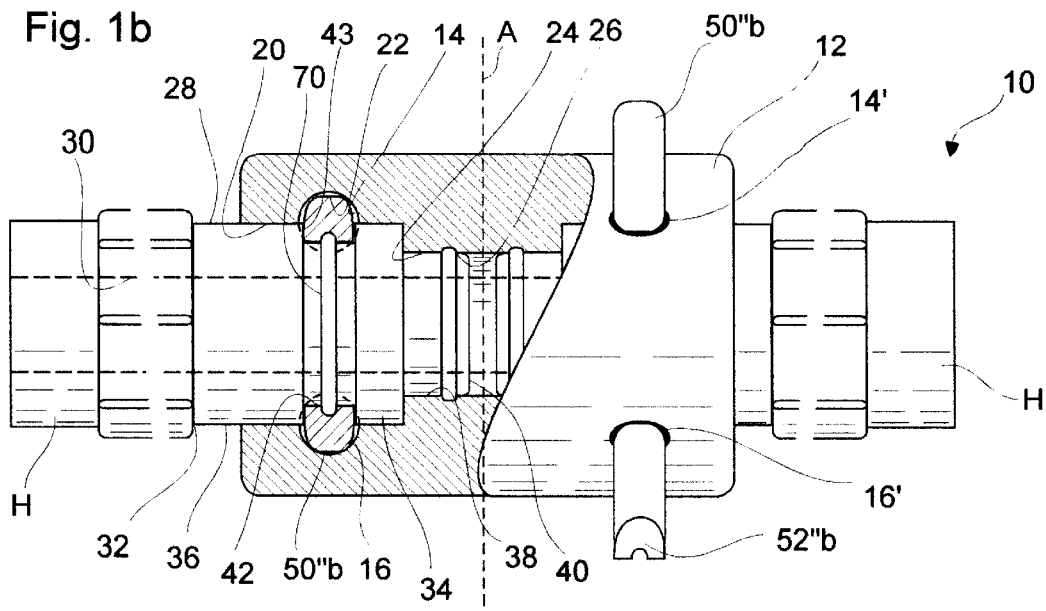
FIG. 1b is a side view of another embodiment the present invention with a partial sectional cut-away showing the U-shaped staple of FIG. 2b.

Referring now to the drawings, the detachable hose coupling is generally referred to by the numeral 10. The hose coupling 10 of the type shown is generally used in the mining industry to couple hydraulic fluid hose.

The coupling 10 includes a generally cylindrical female sleeve 12 having a pair of coaxially aligned bored open surfaces 14 and 16 and which are in generally equidistant opposing positions about a vertical plane passing through the center of a longitudinal axis of the coupling 10 and are disposed at one end of the sleeve 12. Another pair of open surfaces 14' an 16' are disposed in a like manner at another end of the sleeve 12 but rotated 90° from bored open surfaces 14 and 16 to ease assembly, but need not be so oriented. The cut-away portion of FIG. 1a depicts open surfaces 14 and 16 on a back side of the coupling 10 as viewed.

The sleeve 12 includes a longitudinal inner open surface 20 which axially extends throughout the sleeve 12. The inner open surface 20 includes surface portions 22 and 23 of bored open surfaces 14 and 16, respectively, and reduced annular surfaces 24 and 26. The open surface 20 and annular surfaces 24 and 26 are on both sides of the center line A, but only half are shown in the cut-away of FIGS. 1a and 1b.

The coupling 10 also includes a generally cylindrical male piece 28 having open surface 30 axially extending longitudinally therethrough to permit fluid communication therethrough with hose H. Two male pieces 28 are employed in the sleeve 12. The male piece 28 has one end 32 connected to hose H and another end 34 to be received approximately half way within the female sleeve 12. The male piece 28 includes external surface portions 36, 38 and 40 which are of a lesser diameter than open surface 20 and annular surfaces 24 and 26, respectively, to permit slidable receipt of the male piece 28 into the sleeve 12. The male piece 28 also includes an external cylindrical recessed surface 42 which, when the male piece 28 is inserted into the sleeve 12, generally aligns with the surface potions 22 and 23.

As seen in FIG. 1a, two staples 50a are provided to interconnect the female sleeve 12 and male pieces 28. The staple 50a is generally U-shaped having outwardly flared ends 52a. FIG. 1b depicts another embodiment with the recessed surface 42 including a radially protruding guide surface 70 on the male piece 28. FIGS. 2a–5b depict novel embodiments of the U-shaped staple of the invention. It is contemplated that other configurations may also be employed to carry out the invention and should be included in the scope of the appended claims.

The cross-sectional configuration of the U-shaped staple of the invention in conjunction with the female sleeve 12 and male piece 28 should be multi-purposed. The exterior surface of the U-shaped staple should be configured with contact points not substantially causing brinelling of surface portions 22 and 23 and recessed surface 42 nor side surfaces 43a and. Further, the configuration should provide a suitable amount of fluid/air flow between the coupling sleeve 12, male piece 28 and the U-shaped staple.

Figure 5B:
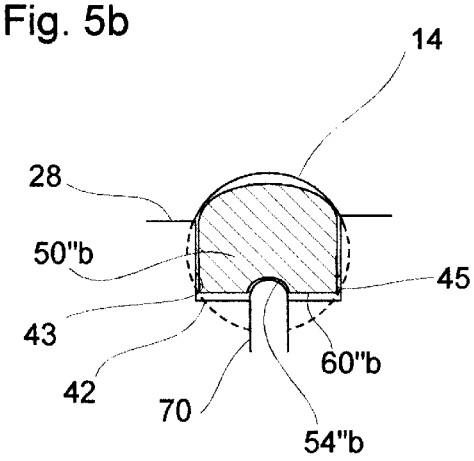
FIG. 5b is a cross-section of yet another embodiment of a U-shaped staple.
Figure 4B:
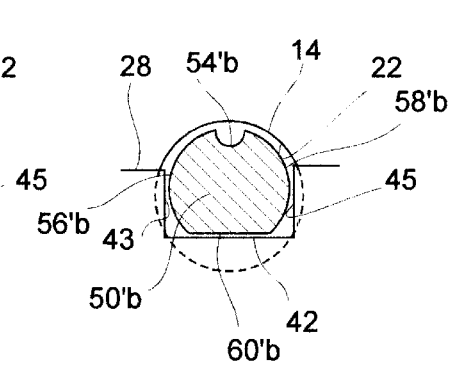
FIG. 4b is a cross-section of still another embodiment of a U-shaped staple.
Figure 5A:
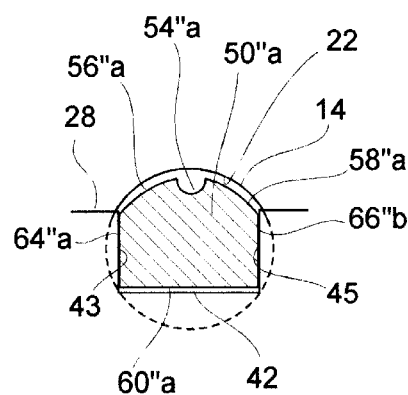
FIG. 5a is a cross-section of still another embodiment of a U-shaped staple.
Figure 3B:
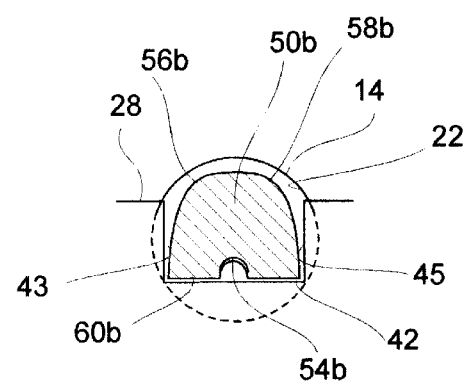
FIG. 3b is a cross-section of another embodiment of a U-shaped staple.

Particularly the U-shaped staple of the present invention is configured with a cross-sectional design having at least one linear flat surface for disposal adjacent the cylindrical external recessed surface 42 of a male coupling piece 28 and has a radial arcuate surface for disposal adjacent the generally arcuate surfaces 22 and 23. As seen in FIGS. 3a, 4b and 5a, the arcuate surface 56a and 58a, 56'b and 58'b, and 56"a and 58"a includes at least one radially recessed surface portion 54a, 54'b, and 54"a, respectively, to permit a predetermined amount of fluid flow therethrough. FIGS. 3b and 5b show at least one radially recessed surface portion 54b and 54"b, respectively.

Figure 2B:
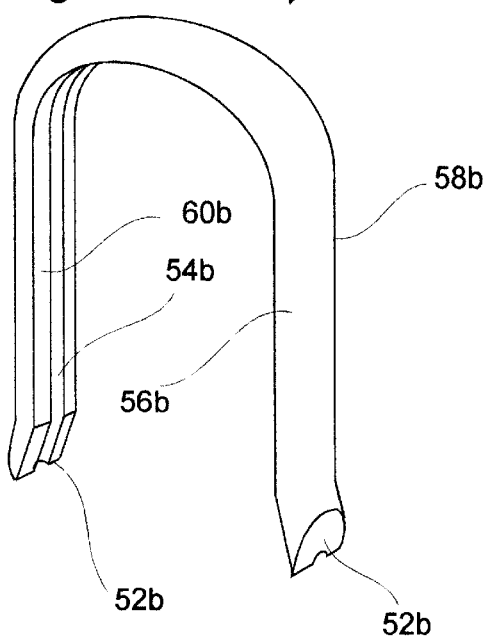
FIG. 2b is a perspective of a U-shaped staple of the present invention showing the U-shaped staple of FIG. 5b.

FIGS. 2a and 3a show a U-shaped staple 50a with a modified D-shaped cross-section having radially recessed surface 54a running along and between arcuate peripheral portion 56a and 58a. Peripheral surface 60a is relatively linear spanning substantially width-wise along the annular recessed surface 42. The recessed surface 42 and bored open surfaces 14, 16 are sized and radially disposed from one another and the center axis of the coupling 10 to accomplish goal. In other words, the open surfaces 14, 16 are coaxially aligned in opposing generally equidistant positions and displaced from a vertical plane passing through a central longitudinal axis. Side areas 55a are adjacent the linear surface 60a and are not in contact with sides 43 and 45. Note the open areas 57 in FIG. 3a. FIG. 3b differs in that the radially recessed surface 54b exists in the linear surface portion 60b.

Figure 4A:
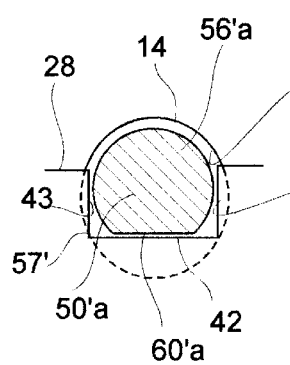
FIG. 4a is a cross-section of yet another embodiment of a U-shaped staple.
Figure 4C:
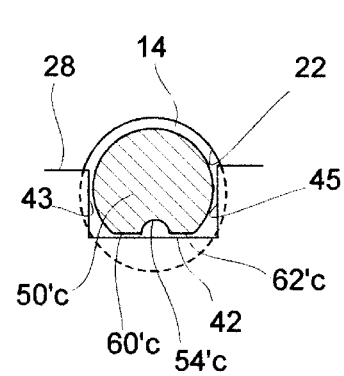
FIG. 4c is a cross-section of yet another embodiment of a U-shaped staple.

FIG. 4a likewise shown the recessed surface 42 and open surface 14 sized and radially spaced from one another to accommodate the staple 50'a. The staple 50'a is generally circular and truncated in cross-section having a linear flat surface 60'a which contacts on recessed surface 42 and an arcuate surface 56'a which contacts a line of contact of bored open surfaces 14. Here, the radially recessed areas inherently are part of the arcuate surface portion 56'a adjacent the linear surface 60'a and which include spaced portions from sides 43 and 45. Note the open areas 57'. FIGS. 4b and 4c further show radially recessed surface:s 54'b and 54'c between arcuate surface portion 56'b and 58'b and linear surface portions 60'c and 62'c, respectively.

FIG. 5a shows yet another embodiment which is configured to prevent brinelling. Linear sides 64"a and 66"b are provided are adjacent the linear surface 60" and are in contact with sides 43 and 45, respectively. The recessed surface 54a" is provided between arcuate surface portions 56"a and 58"a to permit fluid flow thereby and which can generally flow through interconnecting open surfaces of surfaces 22, 23 and 42 in a generally unobstructed manner. FIG. 5b differs in that the recessed surface 54"b is in the linear surface 60"b. Also, FIG. 5b depicts the protruding radial surface 70 of recessed surface 42 which can cooperate as a guide with surface 70 to insure complete connection between the parts while still accomplishing the intended goals of the present invention.

The above described embodiments are set forth by way of example and is not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A detachable hose coupling having improved interlocking U-shaped staple, which includes:

a generally cylindrical female sleeve piece having a pair of coaxially aligned bored open surfaces which are in opposing generally equidistant positions and displaced from a vertical plane passing through a central longitudinal axis of said female sleeve piece and further has a longitudinal axial open surface extending therethrough in communication with said bored open surfaces;

a generally cylindrical male piece of a size and configuration to permit insertion into said female sleeve piece wherein said male piece has a longitudinal axial open surface extending therethrough and further has external recessed surface portion which when said male piece is inserted into said female sleeve piece is generally alignable with said bored surfaces to provide an interconnecting open surface through said detachable hose coupling, and wherein said recessed surface is further defined to provide a first line of contact of a first predetermined configuration in said interconnecting open surface and said bored open surfaces each provide a second and third line of contact of a second predetermined configuration in said interconnecting open surface; and a generally U-shaped staple having a cross-sectional with at least a first peripheral surface of a complimentary configuration to said first predetermined configuration for contact with said first line of contact and having a second peripheral surface of a complimentary configuration to said second predetermined configuration for contact with said second line and third lines of contact, wherein at least one of said first peripheral surface and said second peripheral surface includes at least one radially recessed surface portion to permit a predetermined amount of fluid flow thereby, and wherein said U-shaped staple has a generally D-shaped cross-section having and radially recessed surface defined in said second peripheral arcuate surface.

2. The detachable coupling of claim 1, wherein said first line said first predetermined configuration is linear and said second predetermined configuration is arcuate and wherein said first peripheral surface is linear and said second peripheral surface is arcuate.

3. The detachable coupling of claim 2, wherein said recessed surface of said male piece is cylindrical about said male piece and said bored open surfaces are generally cylindrical.

4. The detachable coupling of claim 2, wherein said U-shaped staple has a generally D-shaped cross-section having, said radially recessed surface defined in said first peripheral linear surface.

5. A detachable hose coupling having improved interlocking U-shaped staple, which includes:
 a generally cylindrical female sleeve piece having a pair of coaxially aligned bored open surfaces which are in opposing generally equidistant positions and displaced from a vertical plane passing through a central longitudinal axis of said female sleeve piece and further has a longitudinal axial open surface extending therethrough in communication with said bored open surfaces;
 a generally cylindrical male piece of a size and configuration to permit insertion into said female sleeve piece wherein said male piece has a longitudinal axial open surface extending therethrough and further has external recessed surface portion which when said male piece is inserted into said female sleeve piece is generally alignable with said bored open surfaces to provide an interconnecting open surface through said detachable hose coupling, and wherein said recessed surface is further defined to provide a first line of contact of a first predetermined configuration in said interconnecting open surface and said bored open surfaces each provide a second and third line of contact of a second predetermined configuration in said interconnecting open surface; and
 a generally U-shaped staple having a cross-sectional with at least a first peripheral surface of a complimentary configuration to said first predetermined configuration for contact with said first line of contact and having a second peripheral surface of a complimentary configuration to said second predetermined configuration for contact with said second line and third lines of contact, wherein at least one said first peripheral surface and said second peripheral surface includes at least one radially recessed surface portion to permit a predetermined amount of fluid flow thereby, wherein said U-shaped staple has a generally truncated circular shaped cross-section having a linear peripheral surface portion and a remaining circular peripheral surface portion and said remaining circular peripheral surface portion extends greater than 180 degrees about a center point.

6. A detachable hose coupling having improved interlocking U-shaped staple, which includes:
 a generally cylindrical female sleeve piece having a pair of coaxially aligned bored open surfaces which are in opposing generally equidistant positions and displaced from a vertical plane passing through a central longitudinal axis of said female sleeve piece and further has a longitudinal axial open surface extending therethrough in communication with said bored open surfaces;
 a generally cylindrical male piece of a size and configuration to permit insertion into said female sleeve piece wherein said male piece has alongitudinal axial open surface extending therethrough and further has external recessed surface portion which when said male piece is inserted into said female sleeve piece is generally alignable with said bored open surfaces to provide an interconnecting open surface through said detachable hose coupling, and wherein said recessed surface is further defined to provide a first line of contact of a first predetermined configuration in said interconnecting open surface and said bored open surfaces each provide a second and third line of contact of a second predetermined configuration in said interconnecting open surface; and
 a generally U-shaped staple having a cross-sectional with at least a first peripheral surface of a complimentary configuration to said first predetermined configuration for contact with said first line of contact and having a second peripheral surface of a complimentary configuration to said second predetermined configuration for contact with said second line and third lines of contact, wherein at least one of said first peripheral surface and said second peripheral surface includes at least one radially recessed surface portion to permit a predetermined amount of fluid flow thereby, wherein said U-shaped staple has a generally truncated circular shaped cross-section having a linear peripheral surface portion and said radially recessed surface is defined in said circular peripheral surface portion.

7. The detachable coupling of claim 6, wherein said U-shaped staple has a generally truncated circular shaped cross-section having a linear peripheral surface portion and a remaining circular peripheral surface portion.

8. The detachable coupling of claim 7, wherein said radially recessed surface is defined in said linear peripheral surface portion.

9. A detachable hose coupling having improved interlocking U-shaped staple, which includes:
 a generally cylindrical female sleeve piece having a pair of coaxially aligned bored open surfaces which are in opposing generally equidistant positions and displaced from a vertical plane passing through a central longitudinal axis of said female sleeve piece and further has a longitudinal axial open surface extending therethrough in communication with said bored open surfaces;

a generally cylindrical male piece of a size and configuration to permit insertion into said female sleeve piece wherein said male piece has a longitudinal axial open surface extending therethrough and further has external recessed surface portion which when said male piece is inserted into said female sleeve piece is generally alignable with said bored open surfaces to provide an interconnecting open surface through said detachable hose coupling, and wherein said recessed surface is further defined to provide a first line of contact of a first predetermined configuration in said interconnecting open surface and said bored open surfaces each provide a second and third line of contact of a second predetermined configuration in said interconnecting open surface; and a generally U-shaped staple having a cross-sectional with at least a first peripheral surface of a complimentary configuration to said first predetermined configuration for contact with said first line of contact and having a second peripheral surface of a complimentary configuration to said second predetermined configuration for contact with said second line and third lines of contact, wherein at least one of said first peripheral surface and said second peripheral surface includes at least one radially recessed surface portion to permit a predetermined amount of fluid flow thereby, wherein said U-shaped staple has a generally truncated circular shaped cross-section having a linear peripheral surface portion and said external recessed surface of said male piece has a radially protruding surface configured to generally slidably fir within said radially recessed surface defined within said first peripheral linear surface of said U-shaped staple.

10. An improved interlocking U-shaped staple for a detachable hose coupling having a generally cylindrical female sleeve piece having a pair of coaxially aligned bored open surfaces which are in opposing generally equidistant positions and displaced from a vertical plane passing through a central longitudinal axis of the female sleeve piece and further has a longitudinal axial open surface extending therethrough in communication with the bored open surfaces and a generally cylindrical male piece of a size and configuration to permit insertion into the female sleeve piece wherein the male piece has a longitudinal axial open surface extending therethrough and further has external recessed surface portion which when the male piece is inserted into the female sleeve piece is generally alignable with the bored open surfaces to provide an interconnecting open surface through the detachable hose coupling, and wherein the recessed surface is further defined to provide a first line of contact of a first predetermined configuration in the interconnecting open surface and the bored open surfaces each provide a second and third line of contact of a second predetermined configuration in the interconnecting open surface, which includes:

a generally U-shaped staple having a cross-sectional with at least a first peripheral surface of a complimentary configuration to the first predetermined configuration for contact with the first line of contact and having a second peripheral surface of a complimentary configuration to the second predetermined configuration for contact with the second line and third lines of contact, wherein at least one of the first peripheral surface and the second peripheral surface includes at least one radially recessed surface portion to permit a predetermined amount of fluid flow thereby and between the open interconnecting surface when inserted in the coupling, wherein said U-shaped staple has a generally D-shaped cross-section having said radially recessed surface defined in said second peripheral arcuate surface.

11. An improved interlocking U-shaped staple for a detachable hose coupling having a generally cylindrical female sleeve piece having a pair coaxially aligned bored open surfaces which are in opposing generally equidistant positions and displaced from a vertical plane passing through a central longitudinal axis of the female sleeve piece and further has a longitudinal axial open surface extending therethrough in communication with the bored open surfaces and a generally cylindrical male piece of a size and configuration to permit insertion into the female sleeve piece wherein the male piece has a longitudinal axial open surface extending therethrough and further has external recessed surface portion which when the male piece is inserted into the female sleeve piece is generally alignable with the bored open surfaces to provide an interconnecting open surface throught the detachable hose coupling, and wherein the recessed surface is further defined to provide a first line of contact of a first predetermined configuration in the interconnecting open surface and the bored open surfaces each provide a second and third line of contact of a second predetermined configuration in the interconnecting open surface, which includes:

a generally U-shaped staple having a cross-sectional with at least a first peripheral surface of a complimentary configuration to the first predetermined configuration for contact with the first line of contact and having a second peripheral surface of a complimentary configuration to the second predetermined configuration for contact with the second line and third lines of contact, wherein at least one of the first peripheral surface and the second peripheral surface includes at least one radially recessed surface portion to permit a predetermined amount of fluid flow thereby and between the open interconnecting surface when inserted in the coupling, wherein said U-shaped staple has a generally truncated circular shaped cross-section having a linear peripheral surface portion and a remaining circular peripheral surface portion and said remaining circular peripheral surface portion extends greater than 180 degrees about a center point.

12. An improved interlocking U-shaped staple for a detachable hose coupling having a generally cylindrical female sleeve piece having a pair of coaxially aligned bored open surfaces which are in opposing generally equidistant positions and displaced from a vertical plane passing through a central longitudinal axis of the female sleeve piece and further has a longitudinal axial open surface extending therethrough in communication with the bored open surfaces and a generally cylindrical male piece of a size and configuration to permit insertion into the female sleeve piece wherein the male piece has a longitudinal axial open surface extending therethrough and further has external recessed surface portion which when the male piece is inserted into the female sleeve piece is generally alignable with the bored open surfaces to provide an interconnecting open surface through the detachable hose coupling, and wherein the recessed surface is further defined to provide a first line of contact of a first predetermined configuration in the interconnecting open surface and the bored open surfaces each provide a second and third line of contact of a second predetermined configuration in the interconnecting open surface, which includes:

a generally U-shaped staple having a cross-sectional with at least a first peripheral surface of a complimentary configuration to the first predetermined configuration for contact with the first line of contact and having a second peripheral surface of a complimentary configuration to the second predetermined cconfiguration for contact with the second line and third line of contact, wherein at least one of the first peripheral surface and the second peripheral surface includes at least one radially recessed surface portion to permit a predetermined amount of fluid flow thereby and between the open interconnecting surface when inserted in the coupling, wherein said U-shaped staple has a generally truncated circular shaped cross-section having a linear peripheral surface portion and said radially recessed surface is defined in said circular peripheral surface portion.

13. An improved interlocking U-shaped staple for a detachable hose coupling having a generally cylindrical female sleeve piece having a pair of coaxially aligned bored open surfaces which are in opposing generally equidistant positions and displaced from a vertical plane passing through a central longitudinal axis of the female sleeve piece and further has a longitudinal axial open surface extending therethrough in communication with the bored open surfaces and a generally cylindrical male piece of a size and configuration to permit insertion into the female sleeve piece wherein the male piece has a longitudinal axial open surface extending therethrough and further has external recessed surface portion which when the male piece is inserted into the female sleeve piece is generally alignable with the bored open surfaces to provide an interconnecting open surface through the detachable hose coupling, and wherein the recessed surface is further defined to provide a first line of contact of a first predetermined configuration in the interconnecting open surface and the bored open surfaces each provide a second and third line of contact of a second predetermined configuration in the interconnecting open surface, which includes:

a generally U-shaped staple having a cross-sectional with at least a first peripheral surface of a complimentary configuration to the first predetermined configuration for contact with the first line of contact and having a second peripheral surface of a complimentary configuration to the second predetermined configuration for contact with the second line and third lines of contact, wherein at least one of the first peripheral surface and the second peripheral surface includes at least one radially recessed surface portion to permit a predetermined amount of fluid flow thereby and between the open interconnecting surface when inserted in the coupling, wherein said U-shaped staple has a generally truncated circular shaped cross-section having a linear peripheral surface portion and said external recessed surface of said male piece has a radially protruding surface configured to generally slidable fit within said radially recessed surface defined within said first peripheral linear surface of said U-shaped staple.

* * * * *